US010874970B2

(12) United States Patent
Malgorn et al.

(10) Patent No.: US 10,874,970 B2
(45) Date of Patent: Dec. 29, 2020

(54) FILTER ELEMENT WITH ENDCAP HAVING RIGID REINFORCING MEMBER

(71) Applicant: Cummins Filtration Sarl, Quimper (FR)

(72) Inventors: Gérard Malgorn, Quimper (FR); Joel Coutant, Quimper (FR); Pierrick Bonzi, Tregunc (FR); Didier Jarno, Quimper (FR); Benjamin L. Scheckel, Stoughton, WI (US)

(73) Assignee: CUMMINS FILTRATION SARL, Quimper (FR)

( * ) Notice: Subject to any disclaimer, the term of this patent is extended or adjusted under 35 U.S.C. 154(b) by 220 days.

(21) Appl. No.: 16/062,482

(22) PCT Filed: Dec. 14, 2016

(86) PCT No.: PCT/US2016/066583
§ 371 (c)(1),
(2) Date: Jun. 14, 2018

(87) PCT Pub. No.: WO2017/106295
PCT Pub. Date: Jun. 22, 2017

(65) Prior Publication Data
US 2018/0369733 A1 Dec. 27, 2018

Related U.S. Application Data

(60) Provisional application No. 62/267,389, filed on Dec. 15, 2015.

(51) Int. Cl.
*B01D 46/24* (2006.01)
*B01D 29/21* (2006.01)
(Continued)

(52) U.S. Cl.
CPC ....... *B01D 46/2414* (2013.01); *B01D 27/005* (2013.01); *B01D 29/111* (2013.01); *B01D 29/21* (2013.01); *B01D 2201/291* (2013.01)

(58) Field of Classification Search
CPC ............ B01D 46/2414; B01D 46/2411; B01D 27/005; B01D 29/111; B01D 29/21; B01D 2201/291; B01D 2201/293
See application file for complete search history.

(56) References Cited

U.S. PATENT DOCUMENTS

| 3,013,667 A | 12/1961 | Harold et al. |
| 4,196,027 A | 4/1980 | Walker et al. |
| (Continued) | | |

FOREIGN PATENT DOCUMENTS

| CN | 202001150 U | 10/2011 |
| DE | 10 62 675 | 8/1959 |
| (Continued) | | |

OTHER PUBLICATIONS

Extended European Search Report issued for European Patent Application No. EP 16876549.3, dated Jul. 11, 2019, 6 pages.
(Continued)

*Primary Examiner* — Robert Clemente
(74) *Attorney, Agent, or Firm* — Foley & Lardner LLP (57) ABSTRACT

A filter element comprising a filter media having a first end and a first endcap coupled to the first end of the filter media. The first endcap includes a flexible first endcap body having a first endcap rigid reinforcing member internally embedded therein. The first endcap rigid reinforcing member may comprise a wire mesh screen and the filter media may comprise a pleated filter media. The filter element may further comprise a second endcap coupled to a second end of the filter media. The second endcap may include a flexible
(Continued)

second endcap body having a second endcap rigid reinforcing member internally embedded therein.

19 Claims, 10 Drawing Sheets

(51) Int. Cl.
  *B01D 29/11* (2006.01)
  *B01D 27/00* (2006.01)

(56) References Cited

U.S. PATENT DOCUMENTS

| | | |
|---|---|---|
| 5,484,466 A | 1/1996 | Brown et al. |
| 5,736,040 A | 4/1998 | Duerrstein et al. |
| 5,891,337 A | 4/1999 | Keller et al. |
| 6,086,763 A | 7/2000 | Baumann |
| 6,929,765 B2 | 8/2005 | Cotton et al. |
| RE38,917 E | 12/2005 | Ardes |
| 8,709,248 B2 | 4/2014 | Savage et al. |

FOREIGN PATENT DOCUMENTS

| | | |
|---|---|---|
| DE | 44 16 577 | 11/1994 |
| GB | 2 134 811 | 7/1986 |
| JP | 2005-324147 | 8/1984 |

OTHER PUBLICATIONS

International Search Report and Written Opinion issued for PCT/US2016/066583, dated Apr. 14, 2017, 18 pages.

FILTER ELEMENT WITH ENDCAP HAVING RIGID REINFORCING MEMBER

CROSS REFERENCE TO RELATED APPLICATIONS

The present application is a U.S. National Stage Application of International Application No. PCT/US2016/066583, filed on Dec. 14, 2016, which claims priority to U.S. Provisional Patent Application No. 62/267,389, filed. Dec. 15, 2015. The contents of both applications are incorporated herein by reference in their entirety.

TECHNICAL FIELD

The present application relates generally to fluid filtration systems. More particularly, the present application relates to filter elements for filtration systems.

BACKGROUND

Various types of fluid filtration systems incorporate environmentally friendly filters, commonly known as "green" filters. Generally, these filters include filter elements that can be removed from the filter body for replacement of the filter element, thus eliminating the need to replace the entire filter. In addition, these filter elements are generally made of materials that are incinerable, allowing for easy and safe disposal of the filter cartridge after use.

A filter element generally comprises a filter media having one or more endcaps coupled to ends of the filter media. The endcaps are configured so as to hold the filter media and form a seal between the filter element and a permanent standpipe inserted in a central annulus of the filter media such that a clean side and a dirty side of the filter media are separately maintained. In such "green" filters, the endcaps may be formed from a flexible, incinerable material, such as polyurethane. The flexibility of the material allows the endcap to provide a radial compression force on the filter media in order to ensure the seal between the filter element and the standpipe.

Due to, for example, exposure to various fluids and high heat environments, the inner diameter of the endcap that forms the seal between the standpipe and the filter element may increase over time, resulting in a decline in the radial compression force on the filter media and a loss of the seal between the filter element and the standpipe. For example, an endcap formed of polyurethane alone may result in a gap of about 1-2 mm between the inner diameter of the endcap and the standpipe after only 72 hours in a high temperature, fluid-soaked environment, whereas a minimum of 250 hours is expected for the working life of typical filter elements.

SUMMARY

Various embodiments provide for a filter element comprising a filter media having a first end and a first endcap coupled to the first end of the filter media. The first endcap includes a flexible first endcap body having a first endcap rigid reinforcing member internally embedded therein. The first endcap rigid reinforcing member may comprise a wire mesh screen and the filter media may comprise a pleated filter media. The filter element may further comprise a second endcap coupled to a second end of the filter media. The second endcap may include a flexible second endcap body having a second endcap rigid reinforcing member internally embedded therein.

Additional embodiments provide for a method of forming a filter element, comprising placing a first endcap rigid reinforcing member in a first endcap mold; adding a liquid polymer to the first endcap mold such that the liquid polymer completely covers the first endcap rigid reinforcing member when the first endcap rigid reinforcing member is placed in the first endcap mold; placing a first end of a filter media into the first endcap mold; and allowing the liquid polymer to harden, thereby coupling a first endcap formed by the liquid polymer and the first endcap rigid reinforcing member to the filter media.

Another embodiment relates to a filter housing. The filter housing includes a first section formed of plastic and having a first sealing surface. The plastic forming the first sealing surface is reinforced with a first embedded reinforcement member. The filter housing further includes a second section removably coupled to the first section. The first section and the second section form an internal compartment configured to house a filter component. The second section is formed of plastic and has a second sealing surface. The plastic forming the second sealing surface is reinforced with a second embedded reinforcement member. The filter housing further includes a seal member positioned between the first sealing surface and the second sealing surface.

These and other features, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Various example embodiments provide for a filter element that is configured to better maintain a sufficient seal on a permanent standpipe over time. In particular embodiments, an endcap is provided for green filters that includes the flexibility necessary to impart a radial compression force sufficient for sealing, but maintains a rigidity to prevent deformation and ensure that the seal between the filter element and the standpipe is maintained during an expected working life of the filter element. In further arrangements, a filtration system housing includes an embedded component that provides higher rigidity at a sealing surface of the housing. In such arrangements, the embedded component helps to reduce warping that can occur during use at elevated temperatures, which increases reliability of the seal formed against the sealing surface.

Figure 1:
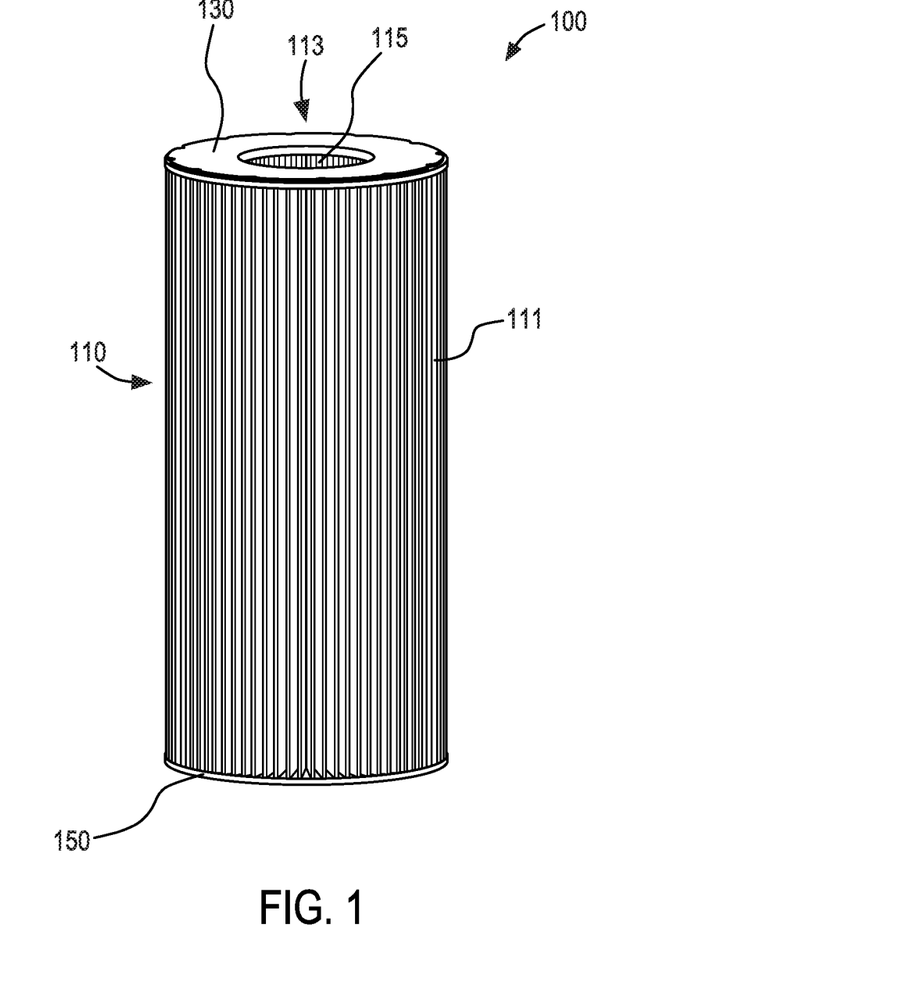
FIG. 1 is a side view of a filter element, according to an example embodiment.

FIG. 1 shows a filter element 100 according to an example embodiment. The filter element 100 includes a filter media 110, a first endcap 130, and a second endcap 150. The filter media 110 depicted in FIG. 1 is substantially cylindrically-shaped and includes an inner annulus 115 that extends along a longitudinal axis of the filter element 100. The inner annulus 115 defines an opening 113 for the passage of a working fluid through the filter media 110. As shown in FIG. 1, the filter media 110 may be a pleated filter media, which includes a plurality of pleats 111 extending along the longitudinal axis of the filter media 110. However, the filter media 110 is not limited to a pleated configuration and may, alternatively, comprise other types of filter media, such as a filter media with tetrahedron channels formed therein. Such an arrangement is described, for example, in U.S. Pat. No. 8,397,920, the contents of which are incorporated herein by reference. The filter element 100 may be configured for use in filtration systems for fuel and/or lube filtration. However, the filter element 100 may alternatively be configured for use in other types of filtration systems, such as for gas or air filtration.

As shown in FIG. 1, the first endcap 130 is coupled to a first end of the filter media 110, and the second endcap 150 is coupled to a second end of the filter media 110 substantially opposite to the first end of the filter media 110. Each of the first endcap 130 and the second endcap 150 are over-molded to the first and second ends of the filter media 110 in a particular embodiment. Moreover, as will be described in more detail below, the second endcap 150 may be configured in the same or substantially the same manner as the first endcap 130 and, in a particular embodiment, is formed of the same material as the first endcap 130. However, in other embodiments, the filter element 100 may include only one endcap (e.g., first endcap 130) that is over-molded to one end of the filter media 110 according to the example embodiments described below, while the other endcap (e.g., second endcap 150) is configured in a different manner, such as an embedded endcap, and may be formed of different materials.

Figure 2A:
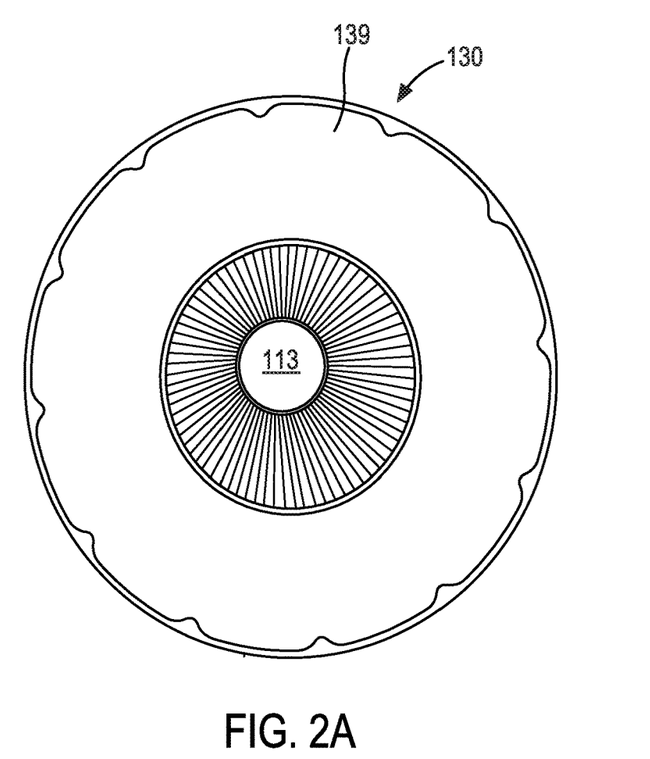
FIG. 2A is a top view of an endcap for the filter element of FIG. 1.
Figure 2B:
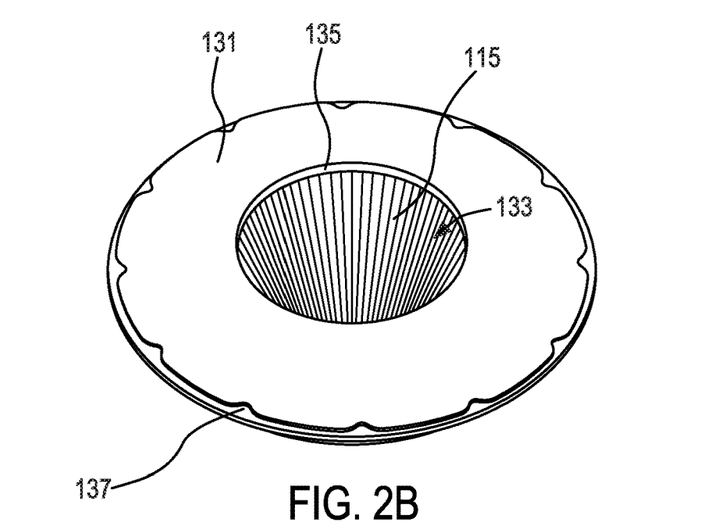
FIG. 2B is a top, perspective view of the endcap for the filter element of FIG. 1.

As shown in FIGS. 2A-2B, the first endcap 130 comprises a first endcap body 139 that includes an annular portion 131, which defines a central flow passage 133. The central flow passage 133 is in fluid communication with the opening 113 of the filter media 110. The first endcap body 139 further includes an inner sealing portion 135, which extends along a portion of an inner circumferential surface of the inner annulus 115 in the longitudinal direction of the filter element 100. The first endcap body 139 also includes an outer sealing portion 137, which extends along a portion of an outer circumferential surface of the filter media 110. The inner sealing portion 135 includes an inner diameter that is sized and configured to seal against a standpipe (not shown) by imparting a radial compression force on the standpipe when the filter element 100 is installed. An upper surface of the first endcap body 139 may be substantially flat or may curve downwardly from a center of the first endcap body 139 in the longitudinal direction of the filter media 110.

The first endcap body 139 of the first endcap 130 comprises a flexible, incinerable material. In a particular embodiment, the first endcap body 139 of the first endcap 130 is formed of polyurethane, but the first endcap body 139 may be formed of any other flexible, incinerable material appropriate for disposal purposes. Accordingly, as shown in the figures, the structure and the material of the first endcap body 139 of the first endcap 130 serves to hold and seal the plurality of pleats 111 of the filter media 110. In addition, due to the flexibility of the first endcap body 139, the inner sealing portion 135 of the first endcap body 139 is configured to directly seal with the permanent standpipe such that a dirty side of the filter media 110 and a clean side of the filter media 110 are separately maintained.

Figure 3:
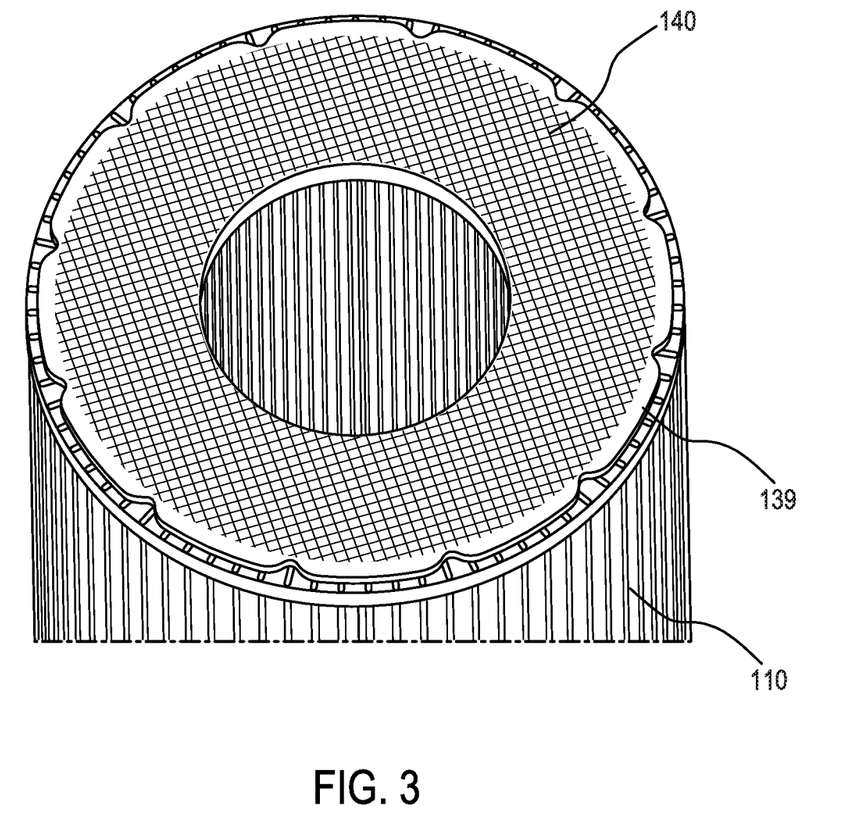
FIG. 3 is a top, perspective view of an inner portion of the endcap for the filter element of FIG. 1.

FIG. 3 shows a top, perspective view of an inner portion of the first endcap 130. As shown in FIG. 3, integrally formed and embedded within the annular portion 131 of the first endcap body 139 is a first endcap rigid reinforcing member 140. The first endcap rigid reinforcing member 140 comprises a disc-like shape that includes outer and inner diameters. As shown in FIG. 3, the inner diameter of the first endcap rigid reinforcing member 140 may be larger or smaller than the inner diameter of the inner sealing portion 135. In some embodiments, the inner diameter of the first endcap rigid reinforcing member 140 may have an interference. The interference may be, for example, about 1 mm, as compared to the inner diameter of the inner sealing portion 135. In this case, the first endcap rigid reinforcing member 140 may be located and centered by its inner diameter in relation to the inner diameter of the inner sealing portion 135. Alternatively, however, the inner diameter of the first endcap rigid reinforcing member 140 may be substantially equal to the inner diameter of the inner sealing portion 135. In addition, the outer diameter of the first endcap rigid reinforcing member 140 may be substantially equal to or smaller than the outer diameter of the annular portion 131. If the first endcap rigid reinforcing member 140 is located and centered by its outer diameter in relation to the outer diameter of the annular portion 131, a gap may be present between in inner diameter of the first endcap rigid reinforcing member 140 and the inner diameter of the inner sealing portion 135. In particular embodiments, in order to provide sufficient reinforcement to the first endcap 130, the surface area of the first endcap rigid reinforcing member 140 ranges from about ¼ to substantially the same surface area of the first endcap 130.

The first endcap rigid reinforcing member 140 comprises a rigid, incinerable material such that the first endcap rigid reinforcing member 140 reinforces the flexible first endcap body 130. In a particular embodiment, the first endcap rigid reinforcing member 140 is formed of polyamide, but may be formed of any other incinerable material having sufficient rigidity for reinforcing the first endcap body 139, such as, for example, polypropylene, polyethylene, or polybutylene terephthalate. The first endcap rigid reinforcing member 140 allows for the flexibility of the inner sealing portion 135 to be maintained in order to provide a sufficient radial compression force on the standpipe when the filter element 100 is installed, but imparts enough rigidity within the first endcap body 130 such that deformation of the inner diameter of the inner sealing portion 135 is limited and a sufficient radial compression force is maintained during the working life of the filter element 100. In a particular embodiment, the second endcap 150 is structured the same or substantially the same as the first endcap 130 shown in the figures. For example, a second endcap rigid reinforcing member may comprise a rigid, incinerable material (such as, for example, polypropylene, polyethylene, or polybutylene terephthalate).

Figure 4:
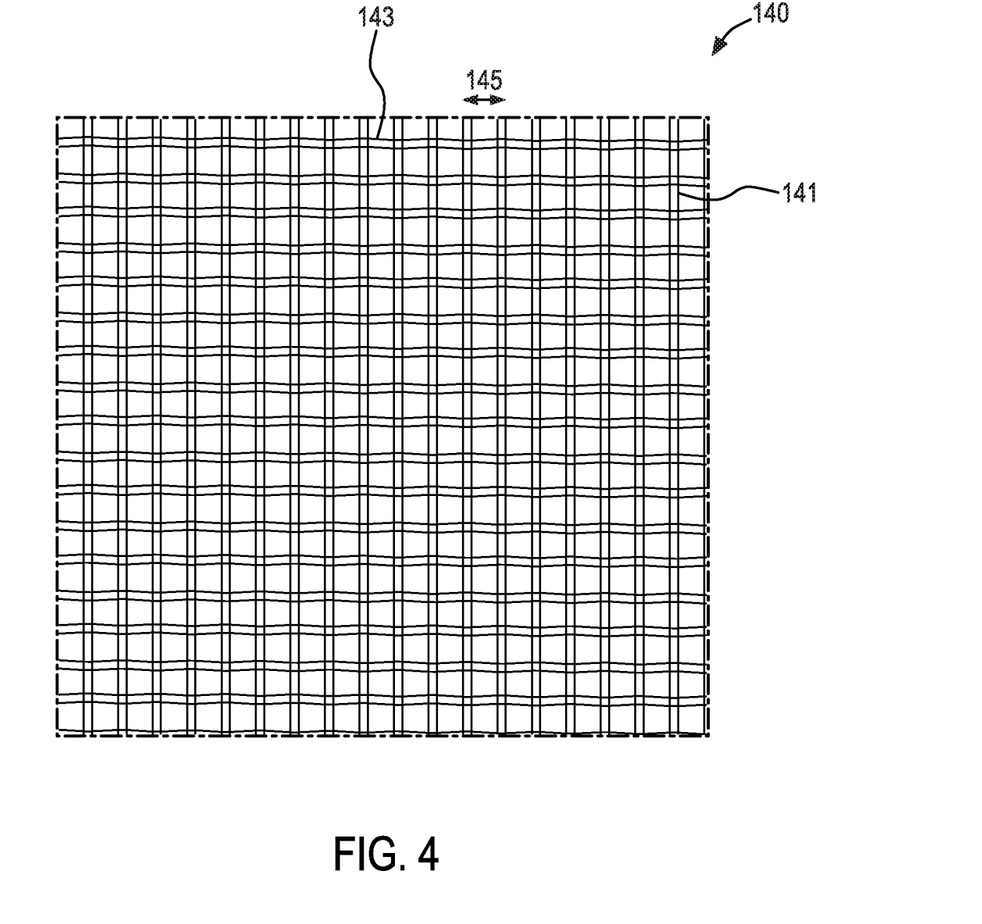
FIG. 4 is a front view of a rigid reinforcing member for the endcap of the filter element of FIG. 1, according to an example embodiment.

As shown in FIG. 4, the first endcap rigid reinforcing member 140 may be configured as a wire mesh screen having a plurality of long wires 141 and a plurality of cross wires 143. The plurality of long wires 141 may extend substantially parallel to one another in a long direction. The plurality of cross wires 143 may extend substantially parallel to one another in a cross direction, which extends substantially perpendicular to the long direction. The plurality of long wires 141 and the plurality of cross wires 143 are formed in a woven lattice pattern where each of the plurality of cross wires 143 alternately overlaps or underlays each of the plurality of long wires 141. Alternatively, in other embodiments, the first endcap rigid reinforcing member 140 may be configured as a non-woven wire mesh (e.g., as an extruded screen). The plurality of long wires 141 and the plurality of cross wires 143 may have substantially equal diameters. The diameters of the wires may range from about 0.35 mm to about 1.5 mm. In a particular embodiment, the diameters of the wires are about 0.7 mm. In addition, the plurality of long wires 141 and the plurality of cross wires 143 may be spaced from an adjacent wire by substantially equal widths 145. The widths 145 may range from about 0.5 mm to about 4 mm. In a particular embodiment, each of the widths 145 is about 2 mm. A thickness of the first endcap rigid reinforcing member 140 may range from about 0.35 mm to about 3 mm, but may be about 1.35 mm in particular embodiments. In addition, in some embodiments, the second endcap 150 may also include a second endcap rigid reinforcing member configured as a wire mesh screen having the same or substantially the same dimensions as the wire mesh screen provided as the first endcap rigid reinforcing member 140.

Figure 5A:
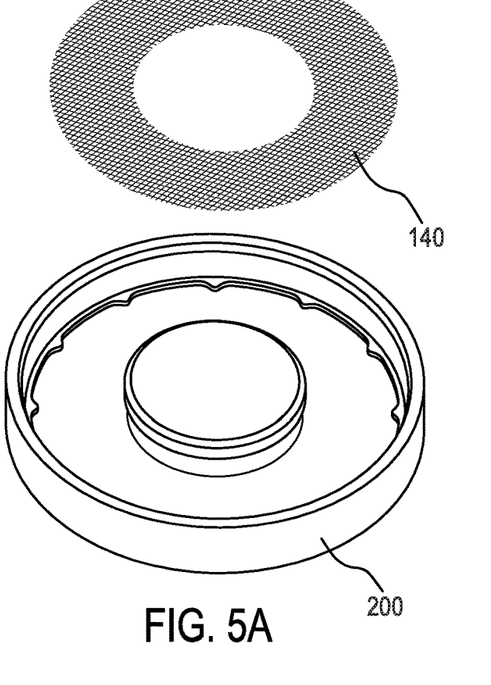
FIGS. 5A-5E are perspective views showing a process for forming an endcap for a filter element, according to an example embodiment.
Figure 5B:
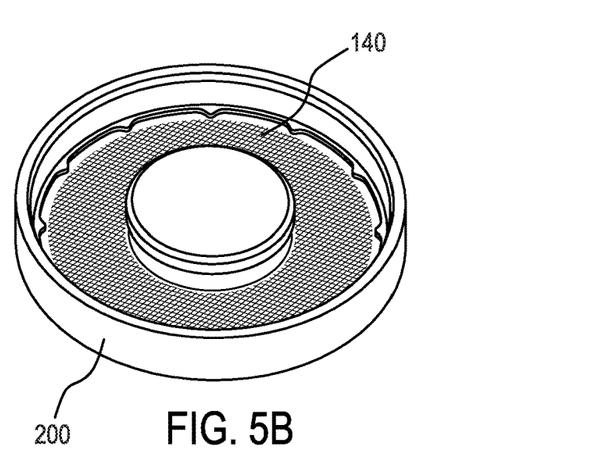
Figure 5C:
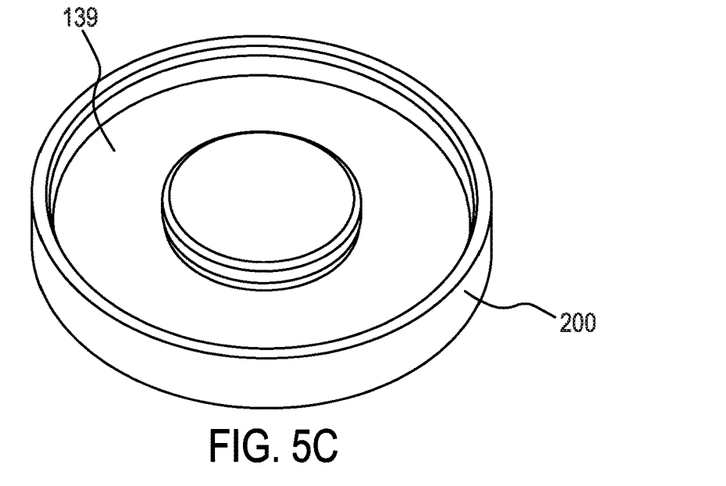
Figure 5D:
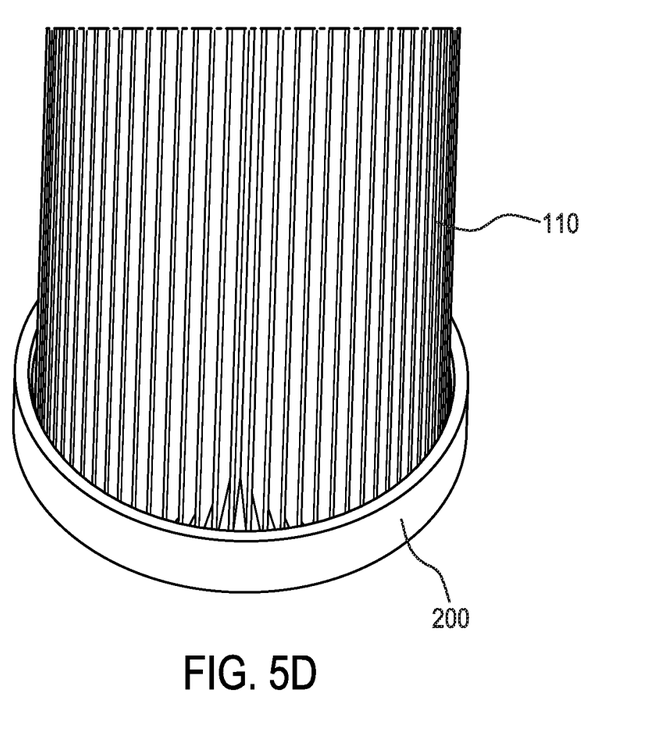
Figure 5E:
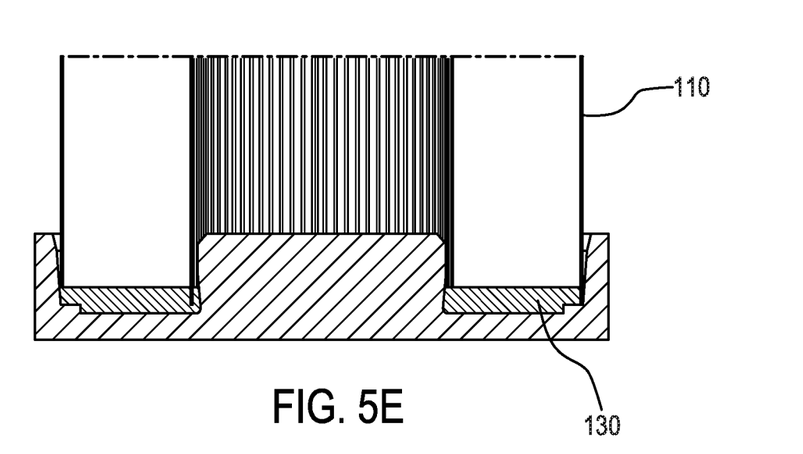

FIGS. 5A-5E illustrate an over-molding process for forming the filter element 100 having a first endcap 130 and a second endcap 150 with first and second endcaps rigid reinforcing members according to an example embodiment. As shown in FIGS. 5A-5E, a first endcap rigid reinforcing member 140 is placed in an endcap mold 200. Liquid polyurethane (or another suitable liquid polymer) for forming the first endcap body 139 is added to the endcap mold 200 to over-mold the first endcap rigid reinforcing member 140 in the formed endcap. As shown in FIG. 5C, the over-molding process allows the liquid polyurethane to completely cover the first endcap rigid reinforcing member 140 such that the first endcap rigid reinforcing member 140 is internally embedded within the formed endcap. As shown in FIG. 5D, one end of the filter media 110 is then placed in the endcap mold 200 and the liquid polyurethane is allowed to harden, thus coupling the endcap to the one end of the filter media 110 to form the first endcap 130. The process may be repeated on the other end of the filter media 110 to form the second endcap 150 having a second endcap rigid reinforcing member (with the same mold or different molds being used for each end depending upon the configuration of the filter elements and manufacturing specifications). The steps of the process is not limited to the order described and may be performed in various orders. For example, the liquid polyurethane may be added to the endcap mold 200 before the first endcap rigid reinforcing member 140 is placed in the endcap mold 200 or both the first endcap rigid reinforcing member 140 and the one end of the filter media 110 may be placed in the endcap mold 200 before the liquid polyurethane is added to the endcap mold 200.

Figure 6:
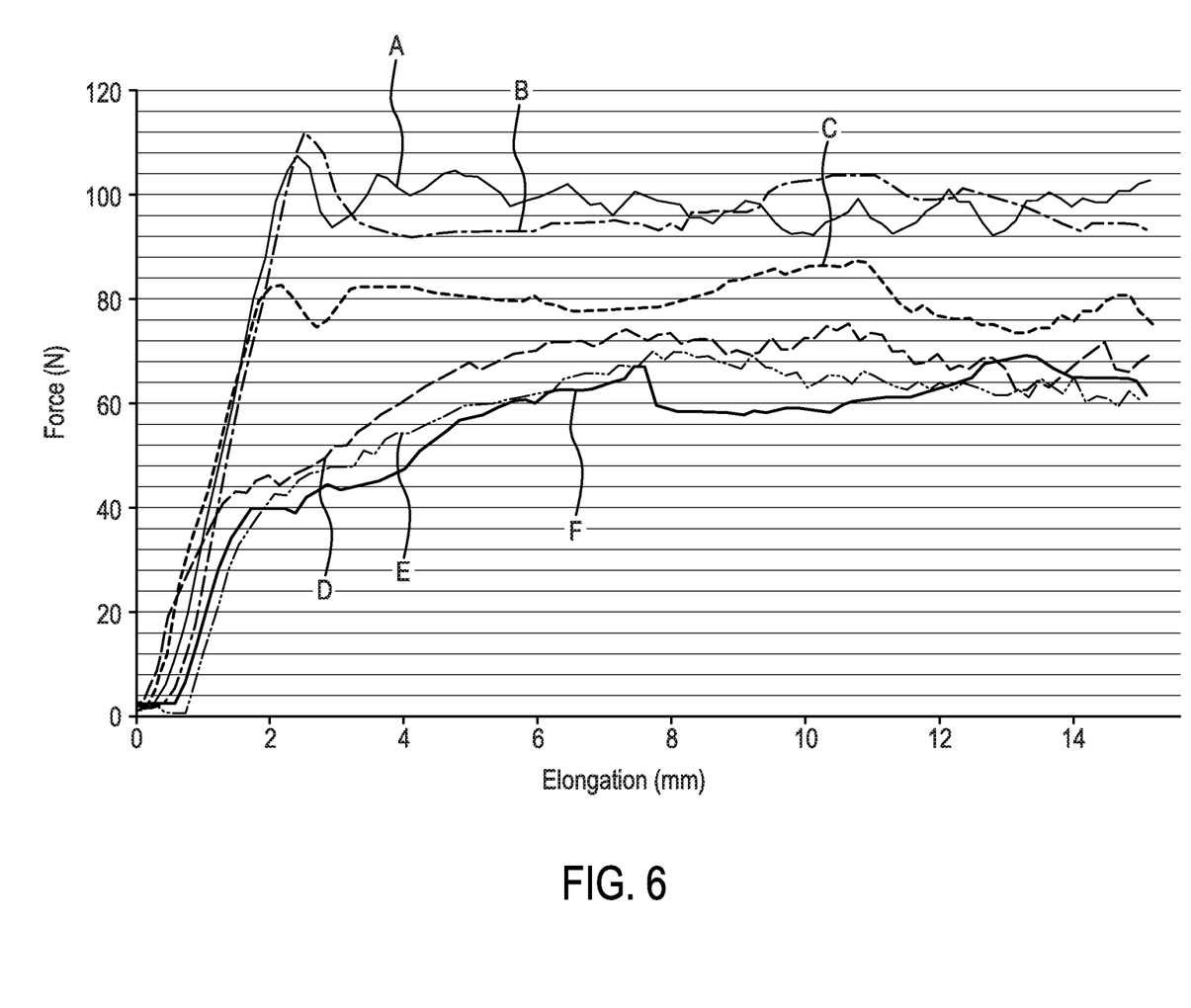
FIG. 6 is a graph showing an installation force for the filter element having the endcap according to the example embodiment after being subjected to an aging test.
Figure 7:
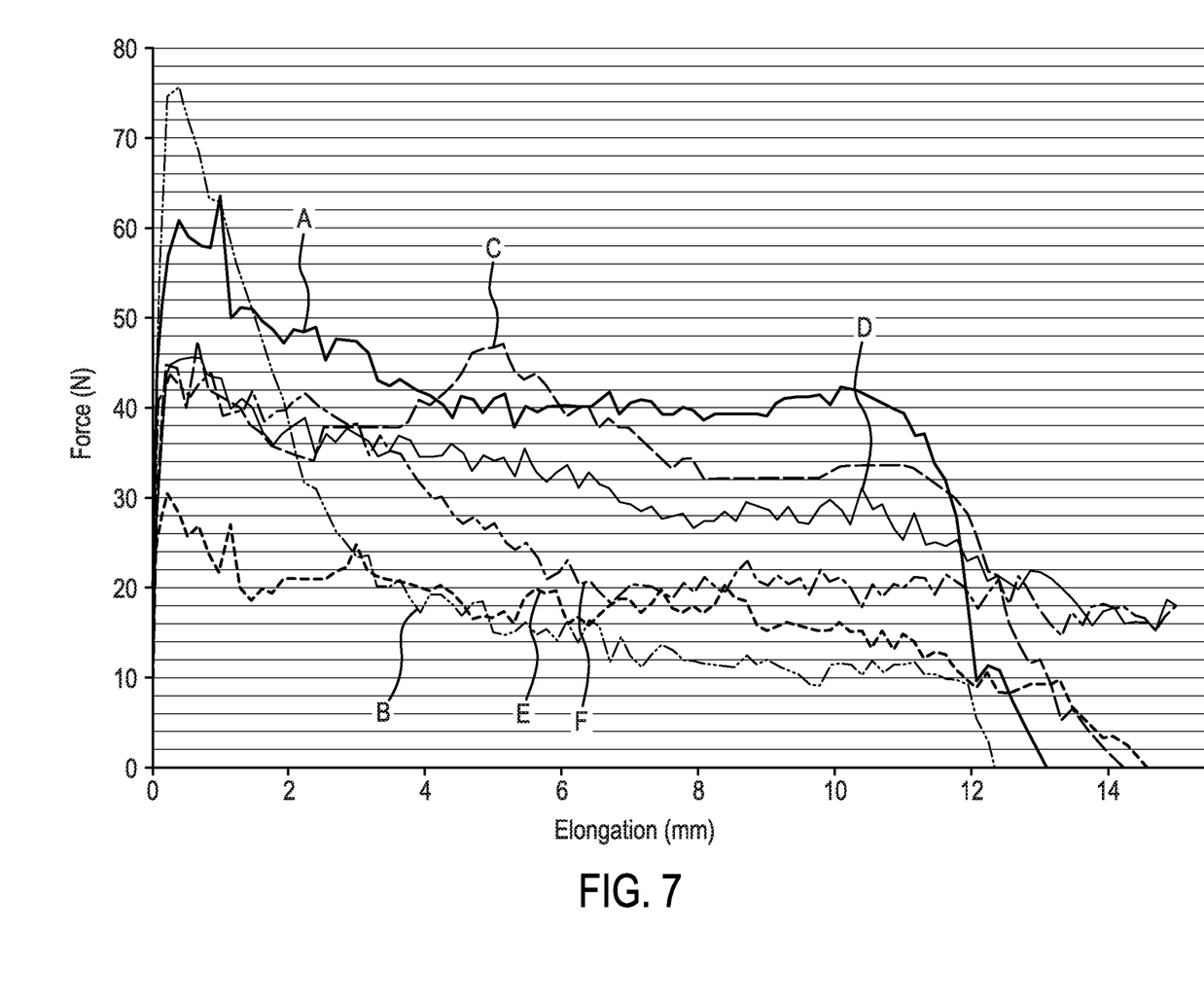
FIG. 7 is a graph showing a removal force for the filter element having the endcap according to the example embodiment after being subjected to an aging test.

As described above, the first endcap rigid reinforcing member 140 provides reinforcement to the endcap in order to maintain rigidity and ensure the seal of the inner sealing portion 135 on the standpipe, even in high temperature, fluid-soaked environments. FIGS. 6 and 7 are graphs representing comparison results of filter elements having endcaps according to the example embodiments described above. Filter elements A-C were new filter elements that were not subjected to aging, while filter elements D-F were used filter elements that were subjected to aging. In aging filter elements D-F, each of the filter elements was soaked in premium oil at 125° C. for a total of 250 hours. FIG. 6 shows the force required to install the filter elements on a standpipe, while FIG. 7 shows the force required to remove the filter elements. As shown in FIG. 6, while filter elements A-C generally required a higher force for installation than filter elements D-F, the decrease in the force of installation of filter elements D-F was minimal, suggesting that sufficient radial compression force was maintained even after an expected working life of the filter element in a high temperature, fluid-soaked environment. Similarly, as shown in FIG. 7, the filter elements A-F exhibited removal forces that were substantially equal, further indicating that the seal between the filter elements D-F and the standpipe was maintained even after aging.

Figure 8A:
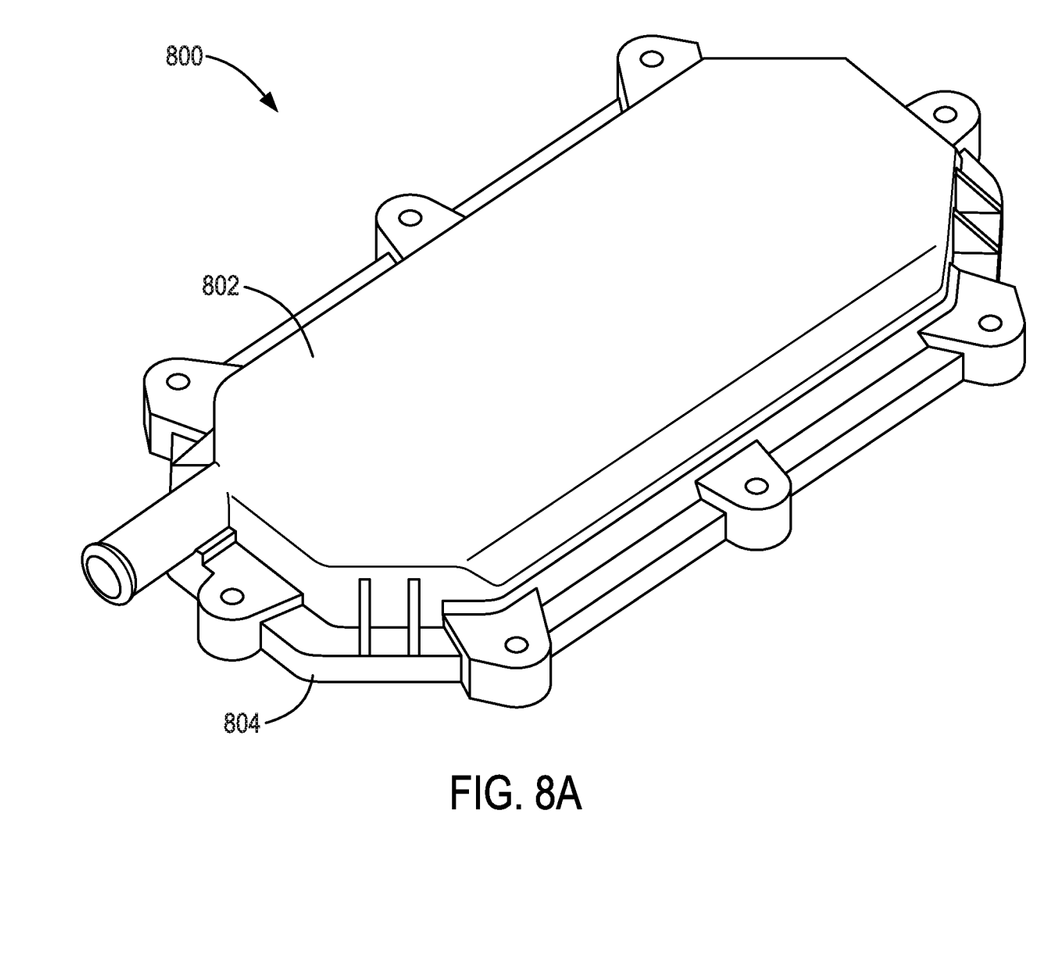
FIG. 8A is a perspective view of a filtration system housing according to another example embodiment.

Referring to FIG. 8A, a perspective view of a housing 800 of a filtration system is shown according to another example embodiment. Generally, the housing 800 includes a first section 802 and a second section 804 (positioned underneath the first section 102 in FIG. 8A). The first section 802 and the second section 804 may be formed, for example, of a plastic through an injection molding process. The first section 802 and the second section 804 are removably coupled to each other and form an internal compartment 806. The internal compartment 806 is structured to house various separator and/or filter components (e.g., a filter element, a crankcase ventilation coalescer, etc.). In some arrangements, the housing 100 is a housing for a crankcase ventilation system that separates oil and aerosols from crankcase blowby gases of an internal combustion engine.

Figure 8B:
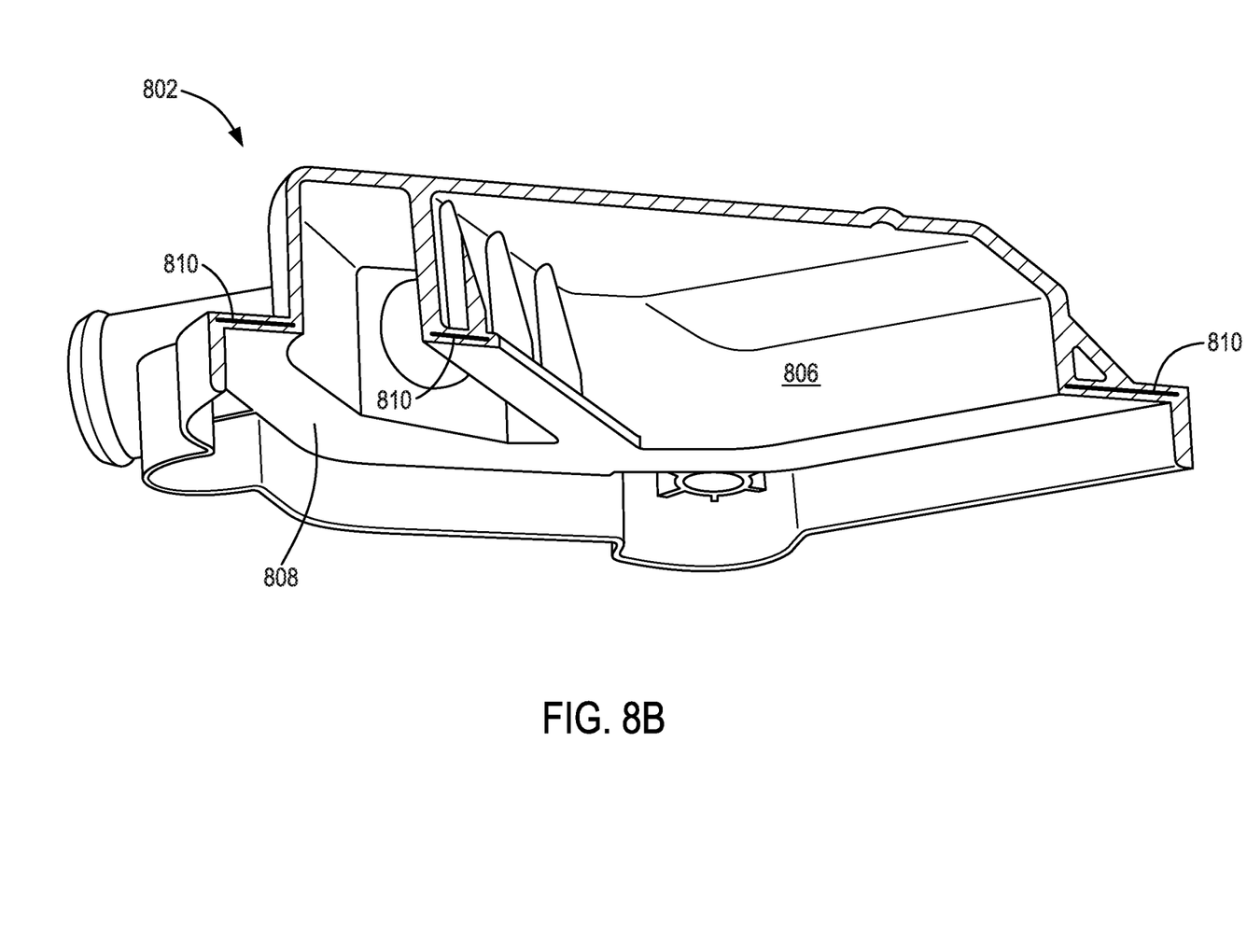
FIG. 8B is a cross-sectional view of a top of the filtration system housing of FIG. 8A.

When the first section 802 and the second section 804 are coupled to each other (e.g., as shown in FIG. 8A), a seal member (not shown) may be positioned between sealing surfaces of the first section 802 and the second section 804 to form a seal between the first section 802 and the second section 804. The seal between the first and second sections 802 and 804 prevents fluid being filtered through the housing 800 from leaking out of the housing 800 and bypassing the housed filter components. As shown in FIG. 8B, the first section 802 includes a sealing surface 808. The sealing surface 808 is generally planar and is structured to form a seal against the seal member. If the sealing surface 808 warps during use (e.g., due to a combination of high pressures within the internal compartment and elevated temperature operating conditions), the seal formed against the seal member may weak or break, thereby reducing the efficiency of the filtration system. For example, if the sealing surface 808 bends or flexes away from the seal member, the seal formed between the seal member and the sealing surface 808 may be broken.

Accordingly, the sealing surface 808 may be reinforced such that the sealing surface remains generally planar during operating conditions. To help increase the rigidity of the sealing surface 808, the first section 802 includes a reinforcement member 810 embedded within the material forming the first section 802 (e.g., embedded within the plastic material). The material forming the first section 802 may be overmolded onto the reinforcement member 810. In some arrangements, the reinforcement member 810 is a rigid plate (e.g., formed of metal or a rigid plastic, such as nylon) that is molded in with the first section 802 with a thin coating of plastic to form the sealing surface 808. The reinforcement member 810 is more rigid than the material used to form the first section 802. Accordingly, the reinforcement member 810 reduces the risk of bowing, flexing, or warping of the sealing surface 808 thereby reducing the risk that the seal formed between the sealing surface 808 and the seal member breaks. The sealing surfaces of the second section 804 can be reinforced with similar reinforcement members in the same manner as described above with respect to the first section 802 (e.g. with a rigid plastic or metal serving as a rigid plate).

Although FIGS. 8A and 8B detail the reinforcement of a sealing surface 808 of a housing 800, it should be understood that similar concepts may be applied to non-housing structures, such as filter cartridge endcaps. In such instances, the filter cartridge endcap may be formed of a liquid polymer that is less rigid than an injection molded plastic (i.e., less rigid than the material used to form the housing 800), and the reinforcement member may be formed of nylon that is potted into the filter cartridge endcap.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "upper," "inner," "outer," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, various parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various example embodiments without departing from the scope of the concepts presented herein.

What is claimed is:

1. A filter element comprising:
   a filter media having a first end; and
   a first endcap coupled to the first end of the filter media, the first endcap including a flexible first endcap body having a first endcap rigid reinforcing member internally embedded therein;
   wherein the first endcap rigid reinforcing member comprises a wire mesh screen.

2. The filter element of claim 1, wherein the filter media comprises a pleated filter media.

3. The filter element of claim 1, wherein the first endcap body comprises an incinerable material.

4. The filter element of claim 1, wherein the first endcap body comprises an annular portion defining a central flow passage, the central flow passage in fluid communication with an opening defined by the filter media.

5. The filter element of claim 4, wherein the first endcap body further comprises an inner sealing portion, the inner sealing portion extending along a portion of an inner circumferential surface of an inner annulus of the filter media in a longitudinal direction of the filter element.

6. The filter element of claim 5, wherein the first endcap rigid reinforcing member comprises a disc shape possessing an inner diameter and an outer diameter, the inner diameter being smaller than an inner diameter of the inner sealing portion.

7. The filter element of claim 5, wherein the first endcap rigid reinforcing member comprises a disc shape possessing an inner diameter and an outer diameter, the inner diameter being larger than an inner diameter of the inner sealing portion.

8. The filter element of claim 5, wherein the first endcap rigid reinforcing member comprises a disc shape possessing an inner diameter and an outer diameter, the inner diameter being substantially equal to an inner diameter of the inner sealing portion.

9. The filter element of claim 5, wherein the first endcap body further comprises an outer sealing portion, the outer sealing portion extending along a portion of an outer circumferential surface of the filter media.

10. The filter element of claim 5, wherein the first endcap rigid reinforcing member comprises a disc shape possessing an inner diameter and an outer diameter, the outer diameter being less than an outer diameter of the annular portion of the first endcap body.

11. The filter element of claim 5, wherein the first endcap rigid reinforcing member comprises a disc shape possessing an inner diameter and an outer diameter, the outer diameter being substantially equal to an outer diameter of the annular portion of the first endcap body.

12. The filter element of claim 1, further comprising:
   a second endcap coupled to a second end of the filter media, the second endcap including a flexible second endcap body having a second endcap rigid reinforcing member internally embedded therein.

13. The filter element of claim 12, wherein at least one of the first endcap rigid reinforcing member and the second endcap reinforcing member comprises an incinerable material.

14. A method of forming a filter element, comprising:
   placing a first endcap rigid reinforcing member in a first endcap mold;
   adding a liquid polymer to the first endcap mold such that the liquid polymer completely covers the first endcap rigid reinforcing member when the first endcap rigid reinforcing member is placed in the first endcap mold;
   placing a first end of a filter media into the first endcap mold;

allowing the liquid polymer to harden, thereby coupling a first endcap formed by the liquid polymer and the first endcap rigid reinforcing member to the filter media;

wherein the first endcap rigid reinforcing member comprises a wire mesh screen.

15. The method of claim 14, wherein the liquid polymer comprises polyurethane.

16. The method of claim 14, wherein the liquid polymer is added to the first endcap mold before the first endcap rigid reinforcing member is placed into the first endcap mold.

17. The method of claim 14, wherein the first end of the filter media is placed in the first endcap mold before the liquid polymer is added to the first endcap mold.

18. The method of claim 14, further comprising:

placing a second endcap rigid reinforcing member in a second endcap mold;

adding the liquid polymer to the second endcap mold such that the liquid polymer completely covers the second endcap rigid reinforcing member when the second endcap rigid reinforcing member is placed in the second endcap mold;

placing a second end of a filter media into the second endcap mold;

allowing the liquid polymer to harden, thereby coupling a second endcap formed by the liquid polymer and the second endcap rigid reinforcing member to the filter media.

19. The method of claim 14, wherein the first endcap mold and the second endcap mold are different molds.

* * * * *